(12) United States Patent
Walker

(10) Patent No.: US 11,913,557 B2
(45) Date of Patent: Feb. 27, 2024

(54) PROTECTION DEVICE FOR A FLUID FLOW LINE, RELATED INSTALLATION AND PROCESS

(71) Applicant: TOTAL SE, Courbevoie (FR)

(72) Inventor: Neil Walker, Aberdeen (GB)

(73) Assignee: TOTAL SE, Courbevoie (FR)

( * ) Notice: Subject to any disclaimer, the term of this patent is extended or adjusted under 35 U.S.C. 154(b) by 97 days.

(21) Appl. No.: 17/602,911

(22) PCT Filed: Apr. 10, 2019

(86) PCT No.: PCT/IB2019/000480
§ 371 (c)(1),
(2) Date: Oct. 11, 2021

(87) PCT Pub. No.: WO2020/208394
PCT Pub. Date: Oct. 15, 2020

(65) Prior Publication Data
US 2022/0170561 A1 Jun. 2, 2022

(51) Int. Cl.
*E21B 34/04* (2006.01)
*E21B 43/017* (2006.01)
*F16K 17/40* (2006.01)
*G05D 16/04* (2006.01)

(52) U.S. Cl.
CPC ............ *F16K 17/40* (2013.01); *E21B 43/017* (2013.01); *G05D 16/04* (2013.01)

(58) Field of Classification Search
CPC ........ E21B 34/02; E21B 34/025; E21B 34/04; E21B 43/017; E21B 43/12; F16K 17/40; G05D 16/04
See application file for complete search history.

(56) References Cited

U.S. PATENT DOCUMENTS

| | | | | | |
|---|---|---|---|---|---|
| 3,227,171 | A | * | 1/1966 | Woelfel | F16K 31/1226 137/488 |
| 4,109,714 | A | * | 8/1978 | Greenlee | E21B 34/16 137/487 |
| 4,240,463 | A | * | 12/1980 | Moore | F16K 17/00 137/488 |
| 2004/0140125 | A1 | | 7/2004 | Dezen et al. | |

FOREIGN PATENT DOCUMENTS

WO 2013/062907 A1 5/2013

OTHER PUBLICATIONS

International Search Report issued in International Patent Application No. PCT/IB2019/000480 dated Jan. 3, 2020.

* cited by examiner

*Primary Examiner* — Matthew R Buck
(74) *Attorney, Agent, or Firm* — TROUTMAN PEPPER HAMILTON SANDERS LLP

(57) ABSTRACT

The protection device has a valve and a valve actuator, able to move the valve to a closed position when a pressure upstream of the valve exceeds a predetermined threshold pressure. The valve actuator includes a biaser, to maintain the valve in an open position; an actuation mechanism, to move the valve to the closed position, the actuation mechanism with a fluid sampling passage to fluidly connect the flow line to a fluid actuated surface of the actuation mechanism. At least a rupture element preventing the passage of fluid from the flow line when the pressure upstream of the rupture element is lower than the threshold pressure, the rupture element being able to break at the threshold pressure.

17 Claims, 6 Drawing Sheets

PROTECTION DEVICE FOR A FLUID FLOW LINE, RELATED INSTALLATION AND PROCESS

CROSS REFERENCE TO RELATED APPLICATIONS

The present application is a U.S. National Phase Application under 35 U.S.C. § 371 of International Patent Application No. PCT/IB2019/000480 filed Apr. 10, 2019. The entire contents of which are hereby incorporated by reference.

FIELD OF THE INVENTION

The present invention concerns a protection device for a fluid flow line, comprising:
- a valve, intended to be mobile in the flow line between an open position in which fluid is able to flow in the flow line and a closed position in which fluid is unable to flow in the flow line;
- a valve actuator, able to move the valve to the closed position when a pressure upstream of the valve exceeds a predetermined threshold pressure.

BACKGROUND

The protection device is in particular used for flow lines transporting hydrocarbons, such as oil and gas collected at the bottom of a body of water. The fluid flow line is for example located downstream of a wellhead of an underwater well between a wellhead and a manifold, or downstream of the manifold.

The pressure in an underwater flow line may vary greatly, depending on the fluid production conditions. For example, during production of oil and gas, the pressure may suddenly increase, for example if a gas bubble or another pressure surge occurs.

Increase of pressure may have critical effects if it is not controlled. For example, it may lead to damages to a flow line or even in some cases, rupture of the flow line. If not contained, such damages may lead to contamination of the water surrounding the flow line with the fluid flowing in the flow line.

To avoid this problem, a solution is to rate the entire flow line to the maximum expected pressure which can occur during production conditions.

Such a solution is generally very expensive. It is also in most cases not necessary, since only some critical parts of the flow lines may ever undergo a substantial increase in pressure.

Alternatively, instrumented high-integrated pressure protection systems (also referred to as "HIPPS") have been used. With these systems, an upstream section of the line is pressure rated at a very high pressure and is equipped with sensors to monitor the pressure within the line. A downstream section of the line has a lesser pressure rating and is cheaper to manufacture.

A safety valve is interposed between the upstream section and the downstream section. The safety valve is actuated with an actuator connected to the sensors. A controller of the valve actuator detects the pressure upstream of the valve. When the pressure exceeds a threshold, the actuator activates the valve to reach its closed position.

Such a protection system remains very expensive, due to the costs of the equipment and sensors which are needed to actuate the system. Moreover, the reliability of the sensors in a very severe underwater environment is sometimes not satisfactory and requires frequent maintenance. A sensor failure may lead to incidents or accidents if the sensors or/and the actuation mechanisms fail.

One aim of the invention is to provide a very reliable protection device for a flow line, which reduces costs of manufacturing and maintenance of the flow line.

SUMMARY

To this aim, the subject matter of the invention is a protection device of the above type, characterized by:
- a biasing member, able to maintain the valve in the open rest position;
- an actuation mechanism, able to act against the biasing member to move the valve to the closed position, the actuation mechanism delimiting at least a fluid actuated surface able to receive fluid from the flow line;
- a fluid sampling passage intended to fluidly connect the flow line to the fluid actuated surface;
- at least a rupture element preventing the passage of fluid from the flow line in the fluid sampling passage downstream of the rupture element when the pressure upstream of the rupture element is lower than the predetermined threshold pressure, the rupture element being able to break at the predetermined threshold pressure to let fluid from the flowline contact the fluid actuated surface.

The protection device according to the invention may comprise one or more of the following features, taken solely or according to any technically feasible combination:
- the valve actuator comprises a removable cartridge containing the or each rupture element, the removable cartridge being at least partially inserted in the fluid sampling passage;
- the removable cartridge is sealingly mounted in the fluid sampling passage, advantageously with a metal to metal seal;
- the removable cartridge has a connecting head protruding out of the fluid sampling passage when the removable cartridge is inserted in the fluid sampling passage, the connecting head being able to be grasped by a remotely operated vehicle or by a diver;
- the removable cartridge has at least an internal lumen connected to an upstream section of the fluid sampling passage and to a downstream section of the fluid sampling passage, each internal lumen receiving the rupture element;
- the removable cartridge has two parallel internal lumens, each lumen containing a rupture element;
- it comprises a housing mounted on the flow line, the housing delimiting the fluid sampling passage, an upstream chamber for receiving the fluid actuated surface and a downstream chamber for receiving the valve at least in the open position;
- the housing is made in one piece of a single material;
- the actuation mechanism comprises a piston having a piston head and a stem connecting the piston head to the valve;
- the actuation mechanism comprises an additional piston, located upstream of the piston head, located apart from the piston head, the additional piston delimiting the fluid actuated surface, and delimiting, on another side facing the piston head, an intermediate volume containing a transmission fluid;
- the piston head has a downstream surface onto which an end of the biasing member rests, the downstream surface delimiting a downstream space containing fluid, the actuation mechanism comprising at least a bleed connected to the downstream space to receive fluid contained in the downstream space when the valve passes from the open position to the closed position;

the valve is a gate valve or a ball valve;

the valve actuator comprises at least a manually operated valve, located in the fluid sampling passage, upstream of the rupture element, to manually close the fluid sampling passage when the manually operated valve is activated; and the device comprises an anti-hydrate fluid injection port, emerging in the fluid sampling passage, upstream of the rupture disc.

The invention also concerns a fluid exploitation installation, comprising:

at least a fluid flow line;

a protection device as defined above, mounted on the fluid flow line, the fluid sampling passage emerging in the fluid flow line upstream of the valve.

The installation according to the invention may comprise the following feature:

the fluid flow line is located underwater in a body of water, and is advantageously chosen among a fluid production line, connected to a wellhead or to a manifold, and/or within a manifold or a wellhead, or is a riser connecting a bottom of the body of water to a surface of the body of water.

The invention also concerns a flow line protection process comprising:

(i) provision of a protection device as defined above on a fluid flow line, the valve being in the open position to let the fluid flow through the flow line;

the fluid flowing in the flow line being sampled from the flow line and flowing to the rupture element through the fluid sampling passage;

(ii) when the pressure of the fluid sampled from the flow line is above the predetermined threshold pressure, rupture of the rupture element with the fluid sampled from the flow line in the fluid sampling passage to open the rupture element;

(iii) application of the fluid sampled from the fluid flow line on the fluid actuated surface through the open rupture element, the fluid sampled from the fluid flow line moving the fluid actuated surface to pass the valve from the open position to the closed position against a biasing force of the biasing member.

The process according to the invention may comprise one or more of the following features, taken solely or according to any technical feasible combination:

the protection device comprises a removable cartridge containing the rupture element, the process comprising, after passing the valve to the closed position:

diffusing the pressure upstream of the valve;

closing the fluid sampling passage and removing the removable cartridge;

placing another removable cartridge containing an intact rupture element in replacement of the removable cartridge containing an open rupture element;

opening the fluid sampling passage.

BRIEF DESCRIPTION OF THE DRAWINGS

The invention will be better understood, upon reading of the following description, given solely as an example, and made in reference to the following drawings, in which.

DETAILED DESCRIPTION

Figure 1:
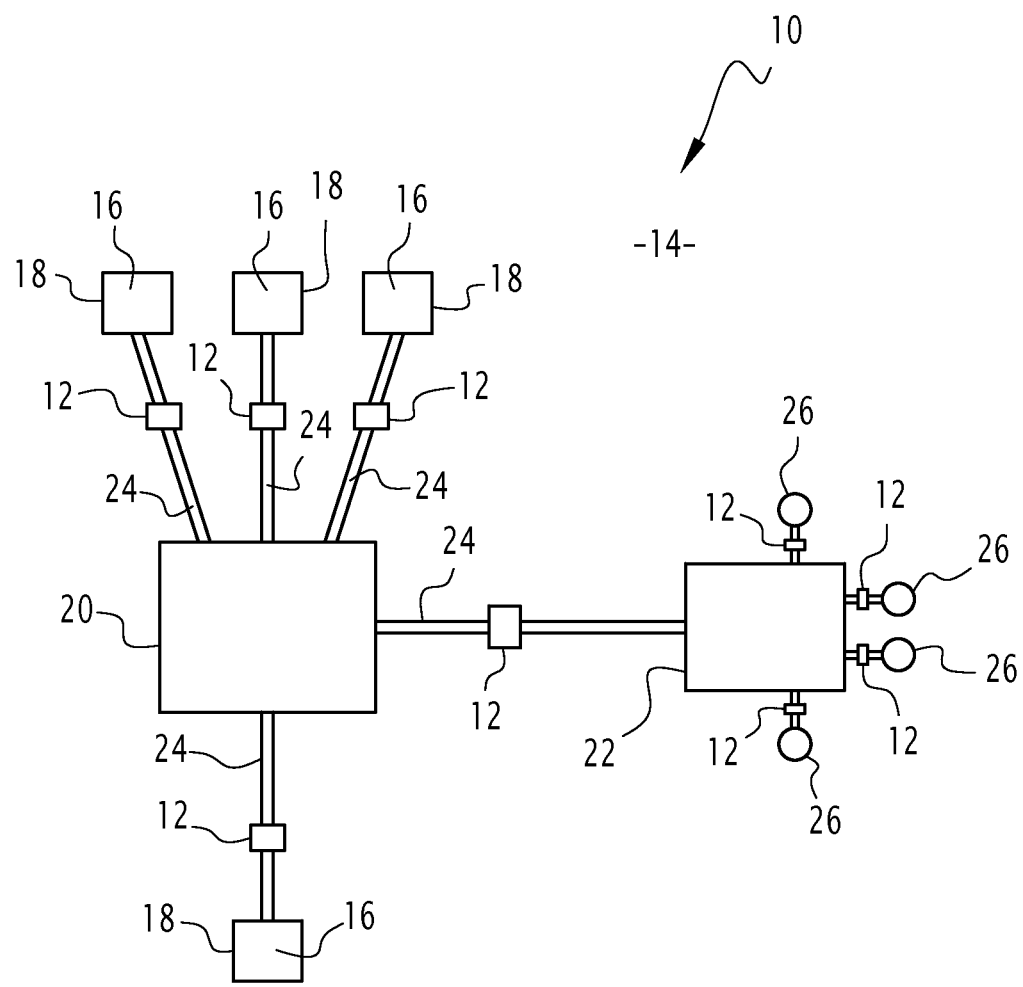
FIG. 1 is an upper view of an example of an underwater fluid exploitation installation, the installation comprising at least a protection device according to the invention.

A first installation 10 comprising a flow line protection device 12 according to the invention is shown in FIG. 1. The installation 10 is a fluid exploitation installation, in particular a fluid production installation.

The fluid which is produced in the installation comprises hydrocarbons, in particular oil and gas.

The installation 10 shown in FIG. 1 is located in a body of water 14, in particular at the bottom of the body of water 14.

The installation 10 comprises at least a well 16 bored in the ground, and a wellhead 18 closing each well 16. The installation 10 further comprises at least a manifold 20 collecting the fluid produced from one or more wells 16 and a termination 22 to transfer the fluid produced in the wells 16 and collected in the manifold 20 towards a surface installation (not shown).

The installation 10 further comprises several flow lines 24 connecting respectively each wellhead 18 to the manifold 20 and connecting the manifold 20 to the termination 22.

The installation 10 also comprises other flow lines 26 connecting the termination 22 to the surface, the latter flow lines being generally referred to as "risers".

Figure 2:
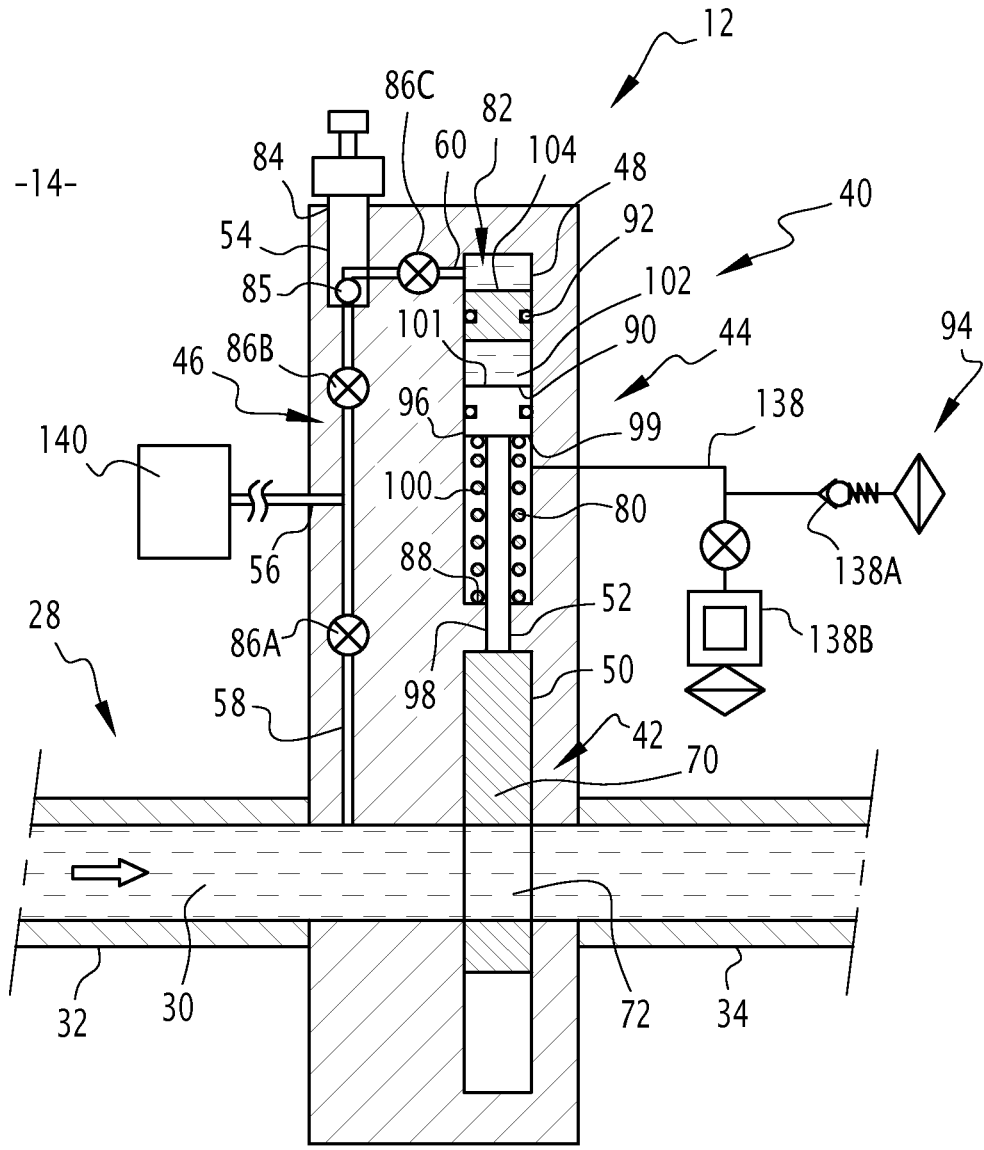
FIG. 2 is a section view of a flow line equipped with a protection device according to the invention, the valve being in the open position.

In reference to FIG. 2, the flow lines 24, 26 are for example made of a rigid pipe 28 defining an internal canal 30 in which fluid flows. Alternatively, at least one flow line 24, 26 is made of a flexible pipe also delimiting an internal canal 30.

At least one flow line 24, 26 is equipped with a flow line protection device 12 according to the invention.

In the example of FIG. 1, flow lines 24 connecting a wellhead 18 to a manifold 20 are each equipped with a protection device 12. Flow line 24 connecting the manifold 20 to the termination 22 may also be equipped with a flow line protection device 12.

In addition, flow line 26 may also be equipped with a protection device 12 according to the invention.

Flow lines 24, 26 which are equipped with a protection device 12 comprise an upstream section 32, which is pressure rated with a first maximal pressure specification and a downstream section 34, located downstream of the protection device 12 which has another pressure rating, with a second maximal pressure specification, lower than the first maximal pressure specification.

Figure 3:
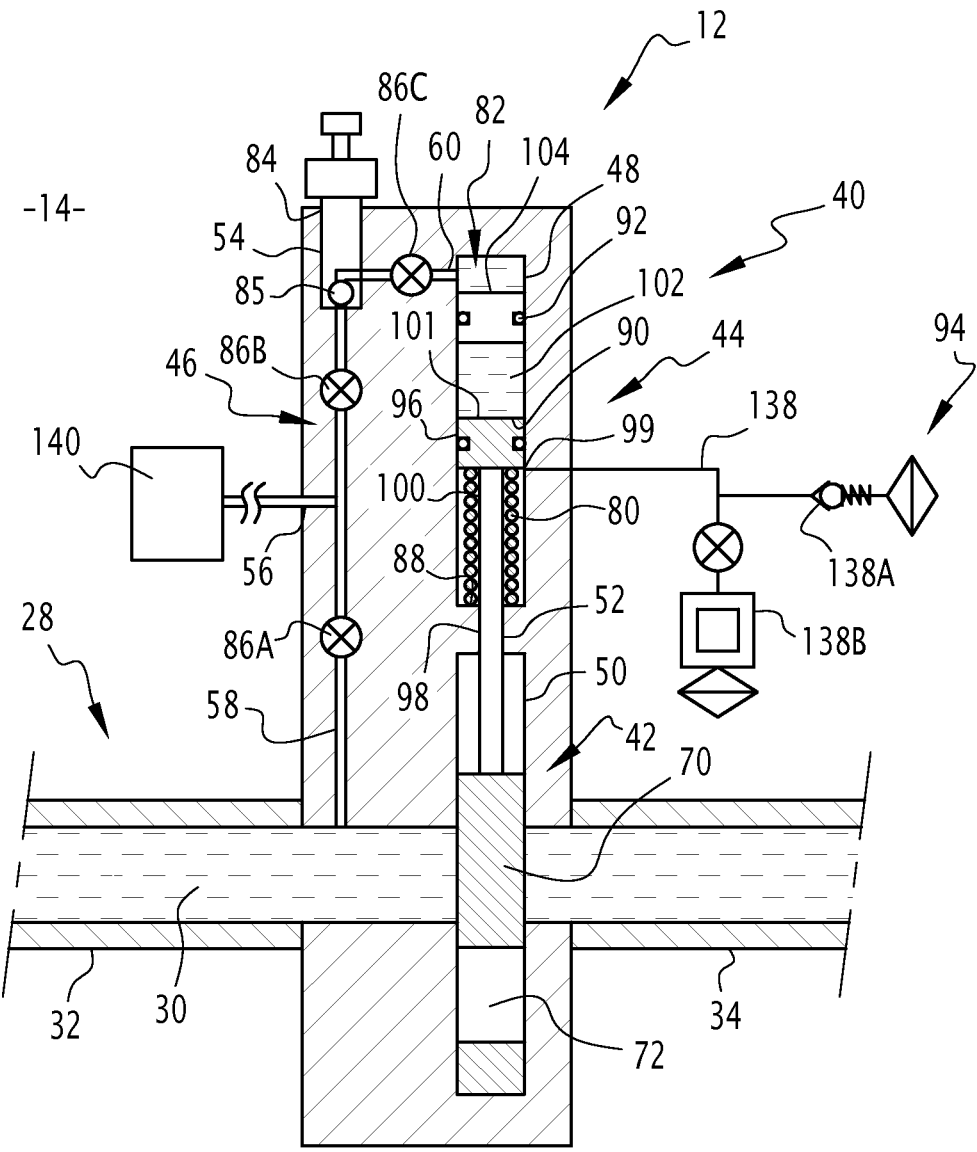
FIG. 3 is a section view similar to FIG. 2, the valve being in a closed position.

As shown in FIGS. 2 and 3, the protection device 12 is mounted on the flow line 24 between the first section 32 and the second section 34. It comprises a housing 40, a valve 42 received in the housing 40 and a valve actuator 44 at least partially received in the housing 40.

The housing 40 is mounted on the flow line 24, 26 transversely to the internal canal 30. It defines a fluid sampling passage 46, emerging in the canal 30, upstream of the valve 42, and an upstream chamber 48 for receiving fluid sampled from the internal canal 30, in order to actuate the valve actuator 44. The housing 40 also defines a downstream chamber 50 receiving the valve 42, emerging in the canal 30, and an intermediate passage 52 connecting the upstream chamber 48 and the downstream chamber 50.

In this example, the housing 40 also delimits a cartridge insertion port 54, and an anti-hydrate fluid injection port 56, emerging in the fluid sampling passage 46, upstream of the cartridge insertion port 54.

Preferentially, housing 40 is made of metal. It is preferentially made in one piece of the same material, for example by forging, to minimize the risk of leaks to the body of water 14.

As shown in FIG. 2, the fluid sampling passage 46 comprises at least an upstream section 58, transverse to the local axis A-A' of the canal 30, emerging in the cartridge insertion port 54 and a downstream section 60 extending parallel to the canal 30 local axis A-A', and connecting the cartridge insertion port 54 to the upstream chamber 48.

The upstream chamber 48, the downstream chamber 50 and the intermediate passage 52 here also extend transversally to the local axis A-A' of the internal canal.

The downstream chamber 50 emerges in the internal canal 30 to allow the travel of the valve 42 in the canal 30.

The cartridge insertion port 54 emerges outside of the housing 40, opposite the canal 30.

The valve 42 is mounted movable in the housing 40 and across the internal canal 30, between an open position, shown in FIG. 2 and a closed position shown in FIG. 3.

In the example of FIGS. 2 and 3, the valve 42 is a gate valve. It comprises a closed shutter 70 able to close the canal 30 in the closed position and a through hole 72 through which fluid flows when it is placed in the canal 30 in the open position.

In the open position, the valve 42 is partially retracted in the downstream chamber 50. Fluid flow is allowed to pass through the internal canal 30 from the first section 32 to the second section 34 across the through hole 72.

In the closed position, shown in FIG. 3, the shutter 70 totally closes the canal 30. The through hole 72 is located apart from the canal 30. Fluid flow through the internal canal 30 from the first section 32 to the second section 34 is prevented.

The valve actuator 44 comprises a biasing member 80 able to permanently bias the valve towards the open position (which is a rest position) and an actuating mechanism 82 able to displace the valve 42 towards the open position against the biasing member 80.

The valve actuator 44 further also comprises a removable cartridge 84 containing at least a rupture element 85, preferentially several parallel rupture elements 85, and at least one, preferentially several manually operated valves 86A, 86B, 86C to insulate the fluid sampling passage 46 for replacement of the cartridge 84.

The biasing member 80 is for example a spring, in particular a coil spring. The biasing member 80 is applied between a seat formed by a downstream shoulder 88 in the upstream chamber 48 and a movable seat on the actuation mechanism 82.

The actuation mechanism 82 comprises a piston 90 connected to the valve 42, preferentially an additional intermediate piston 92 placed in the upstream chamber 48, and a bleed 94 for receiving a fluid contained downstream of the piston 90.

The piston 90 comprises a head 96 sealingly movable in translation in the upstream chamber 48, downstream of the additional piston 92, and a stem 98 connecting the head 96 to the valve 42 through the intermediate passage 52 and the downstream chamber 50.

The piston 90 is jointly movable with the valve 42 to actuate the valve 42 from the open position to the closed position.

The upstream end of the biasing member 80 rests on a downstream surface 99 of the head 96. The downstream surface 99 of the head 96 and the shoulder 88 together delimit in the upstream chamber 48, a downstream space 100 of variable volume emerging in the bleed 94.

The downstream space 100 preferentially contains a lubricating fluid.

An upstream surface 101 of the piston head 96 delimits with the additional piston 92 an intermediate volume 102 containing a transmission fluid, in particular a transmission liquid. The transmission liquid is incompressible.

The additional piston 92, when present, has an upstream actuation surface 104.

The actuation surface 104 is able to be actuated by the pressurized fluid sampled from the internal canal 30 through the fluid sampling passage 46 into the upstream chamber 48, when the pressure of the fluid exceeds a predefined threshold defined by the at least one rupture element 85.

The pressurized fluid from the canal 30 is able to push the actuating surface 104 of the piston 92 to translate the piston 92 downstream and hence, push the incompressible liquid contained in the intermediate volume 102. This consequently pushes the piston head 96, the stem 98 and the valve 42 towards the canal 30, without human or mechanical intervention, and without active actuator system.

The cartridge 84 is removably inserted in the cartridge insertion port 54. In reference to FIG. 4, it comprises a connection head 110 able to cling on the port entrance 112, and an insertion body 114, received in the port 54 to be interposed in the fluid sampling passage 46.

The cartridge 84 further comprises at least a sealing joint 116 to ensure sealing around the insertion body 114 when the insertion body 114 is located in the port 54.

The connection head 110 is able to be carried by a diver and/or by an external vehicle such as a Remotely Operated Vehicle (also referred to as "ROV").

Figure 4:
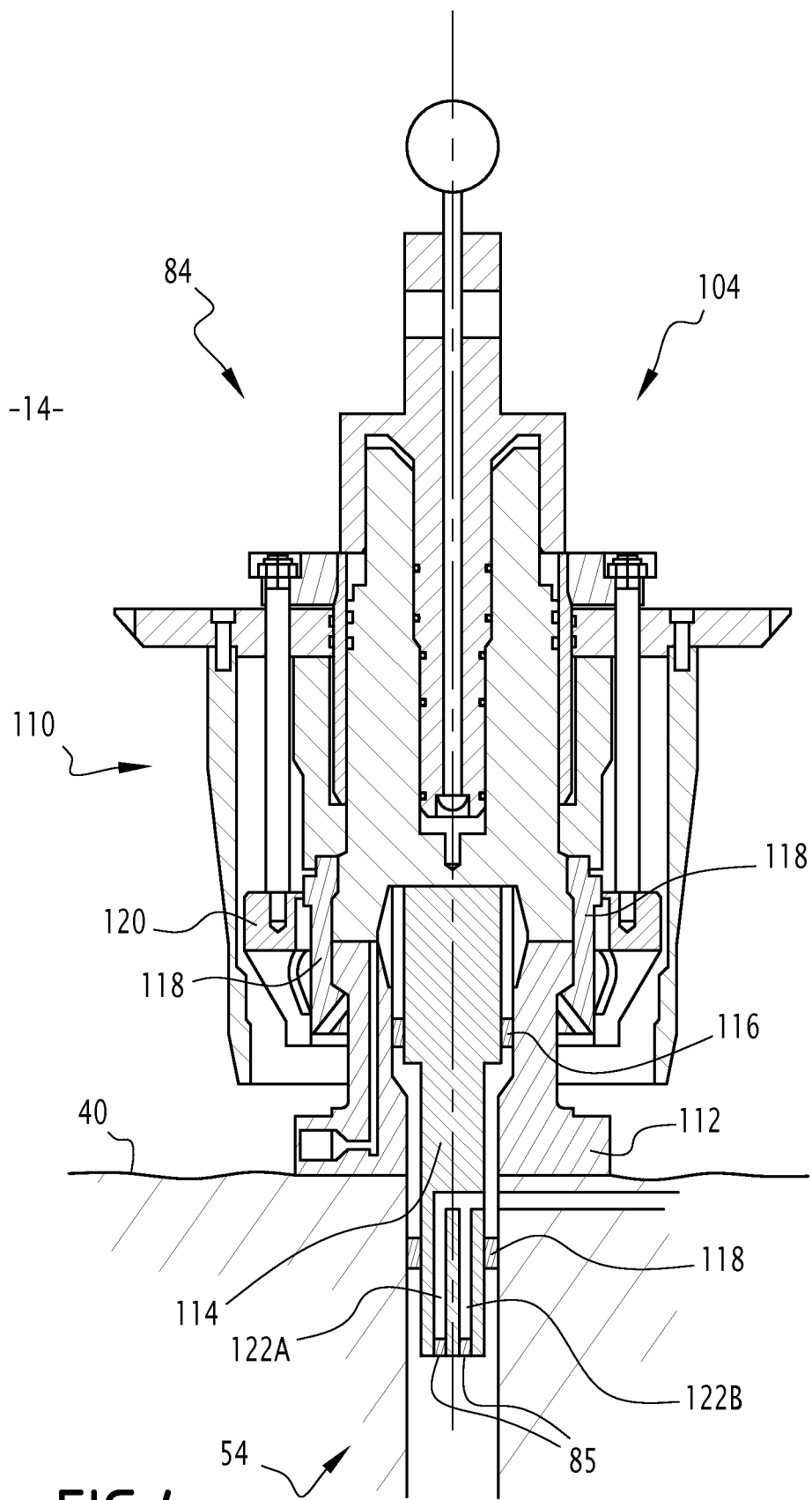
FIG. 4 is a section view of a detail of a removable cartridge containing at least a rupture disc in the protection device of the invention.

As shown in FIG. 4, the connection head 110 comprises a clinging mechanism having for example attachment fingers 118 able to cooperate with the port entrance 112 and a removable lock 120 able to removably immobilize the fingers 118 on the port entrance 112.

The insertion body 114 axially protrudes from the connection head 110. It internally defines at least a lumen 122A, 122B, each containing a rupture element 85.

In the example of FIG. 4, the insertion body 114 defines two parallel lumens 122A, 122B, each containing a rupture element 85.

When the cartridge 84 is inserted in the cartridge insertion port 54, each lumen 122A, 122B emerges upstream in the upstream section 58 of the fluid sampling passage 46. Each lumen 122A, 122B is also fluidly connected downstream to the second section 60 of the fluid sampling passage 46, advantageously by a common downstream section.

Figure 5:
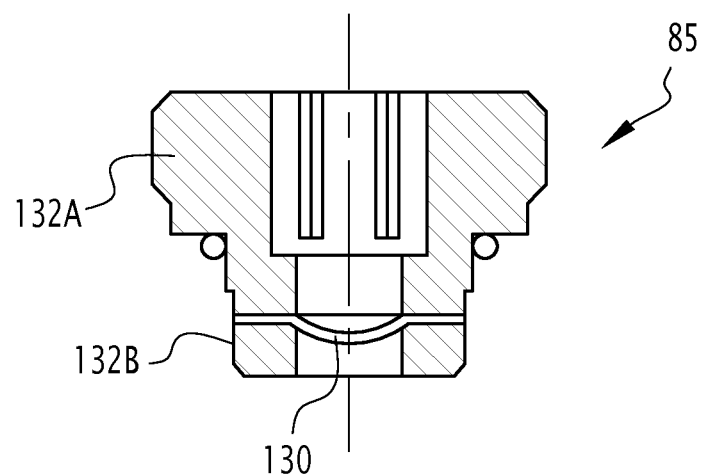
FIG. 5 is a section view of a rupture disc used in the protection device according to the invention.

An example of rupture element 85 is shown in FIG. 5. This rupture element 85 is here a rupture disc 130 pinched between two cylindrical seats 132A, 132B. In this example, the rupture disc 130 has a dome shape to increase its reliability.

The rupture element 85 is calibrated to rupture at the predetermined threshold pressure.

The sealing joints 116 visible on FIG. 4 are for example metal to metal seals able to be put in place by the diver or ROV upon insertion of the cartridge 84 in the port 54.

As shown in FIG. 2, at least part of the manually operated valves 86A, 86B are located in the upstream section 58 of the fluid sampling passage 46. Optionally, one valve 86C is located in the downstream section 60 Each valve 86A, 86B, 86C is able to insulate the upstream section 58 of the fluid sampling passage 46 to allow the replacement of the cartridge 84 after rupture of at least one rupture element 85.

The bleed 94 comprises an evacuation duct 138 fitted with a non-return valve 138A for evacuation of lubricating fluid contained in the downstream space 100 when the valve 42 passes from the open position to the closed position. The bleed 94 also comprises a return compensated circuit 138B for reinjection of lubricating fluid in the downstream space 100 when the valve 42 returns to the open position.

The anti-hydrate injection port 56 is connected to a source of hydrates 140 located underwater or at the surface of the expanse of water. It is able to diffuse an anti-hydrate flow such as a polyethylene glycol or an alcohol such as methanol.

The operation of the protection device 12 according to the invention will now be described.

Initially, before fluid exploitation is started, a flow line protection device 12 is fitted on a flow line 24, 26.

A cartridge 84 containing at least a rupture element 85 is inserted in the cartridge insertion port 54. The sealing joints 116 are set in place. Each lumen 122A, 122B contains an intact rupture disc 130. The biasing member 80 maintains the piston head 96 away from the shoulder 88, and thus, lets the valve 42 in the open position. The manually operated valves 86 are opened.

Fluid circulates in the internal canal 30 of the flow line 24, 26. The fluid in circulation in the internal canal 30 is permanently sampled into the fluid sampling passage 46 to reach each rupture element 85 in the cartridge 84.

If the fluid pressure is below the predefined pressure threshold, each rupture element 85 remains intact and blocks the sampled fluid downstream of the rupture element 85.

An anti-hydrate flux is injected through the anti-hydrate injection port 56 to prevent hydrate formation in the fluid sampling passage 46. The injection can be periodic or continuous. The injection can be directed towards the cartridge insertion port 54 or on the contrary, towards the internal canal 30 when the shutter 70 is in a closed position, before the reopening thereof.

If the pressure of the fluid circulating in the internal canal 30 of the flow line 24 increases, the pressure applied on the rupture element 85 also increases.

When the pressure of the fluid circulating in the internal canal 30 reaches above the threshold pressure, at least one rupture element 85 brakes and opens the corresponding lumen 122A, 122B.

The fluid under pressure then enters the lumen 122A, 122B, and flows to the downstream section 60 of the fluid sampling passage 46 to reach the upstream chamber 48.

Fluid pressure applies on the actuating surface 104. This automatically pushes the additional piston 92 downstream. The translation of the piston 92 within the upstream chamber 48 is transmitted to the piston head 96 of piston 90 through the transmission liquid contained in the intermediate volume 102.

The piston head 96 pushes the biasing member 80 against its biasing force allowing the piston head 96 to translate downstream.

The translation of the piston head 96 compresses the biasing member 80 and pushes the liquid contained in the downstream chamber 100 towards the bleed 94.

The movement of the piston head 96 is transmitted to the valve 42 by the stem 98. The valve 42 enters the internal canal 30 and closes the internal canal 30.

The second section 34 of the line 24, 26 is then insulated from the first section 32 containing the pressurized fluid. Thus, the second section 34 is safe, and does not undergo a pressure rise equal to the pressure rise of the first section 32.

The valve 42 self operates, by the mere transmission of the pressure of the fluid circulating in the internal canal 30, which ruptures the rupture element 85 and pushes the actuating surface 104, without human intervention or active actuation. The protection device 12 is therefore particularly reliable and safe. It does not require any electrical or thermal power. It does not rely on information measured by a sensor.

The protection device 12 according to the invention operates without electronics and reduces the maintenance frequency in comparison with a fully instrumented protection device.

The second section 34 of the flow line 24, 26 can thus be designed with a rating lower than the maximum working pressure. This reduces the overall cost of the installation 10, without affecting the safety of the installation 10.

After the pressure in the first section 32 of the line 24 is relieved, the valve 86A, 86B are closed and the cartridge 84 is removed by a diver or a ROV by disconnecting the connecting head 110.

Another cartridge 84, containing intact rupture elements 85 is then inserted in the cartridge injection port 54 and is sealed by a sealing joint 116.

The intervention on the flow line 24, 26 is therefore easy to carry out and does not require a full change of a line section. The flow line 24, 26 can be put back in production very quickly.

In a variant (not shown), the actuating mechanism 82 does not comprise an additional piston 92. The actuating surface 104 is defined directly on the piston head 96 of piston 90, which contacts fluid from the canal 30 after rupture of a rupture element 85.

In another variant (not shown), the valve 42 is a ball valve instead of a gate valve.

Figure 6:
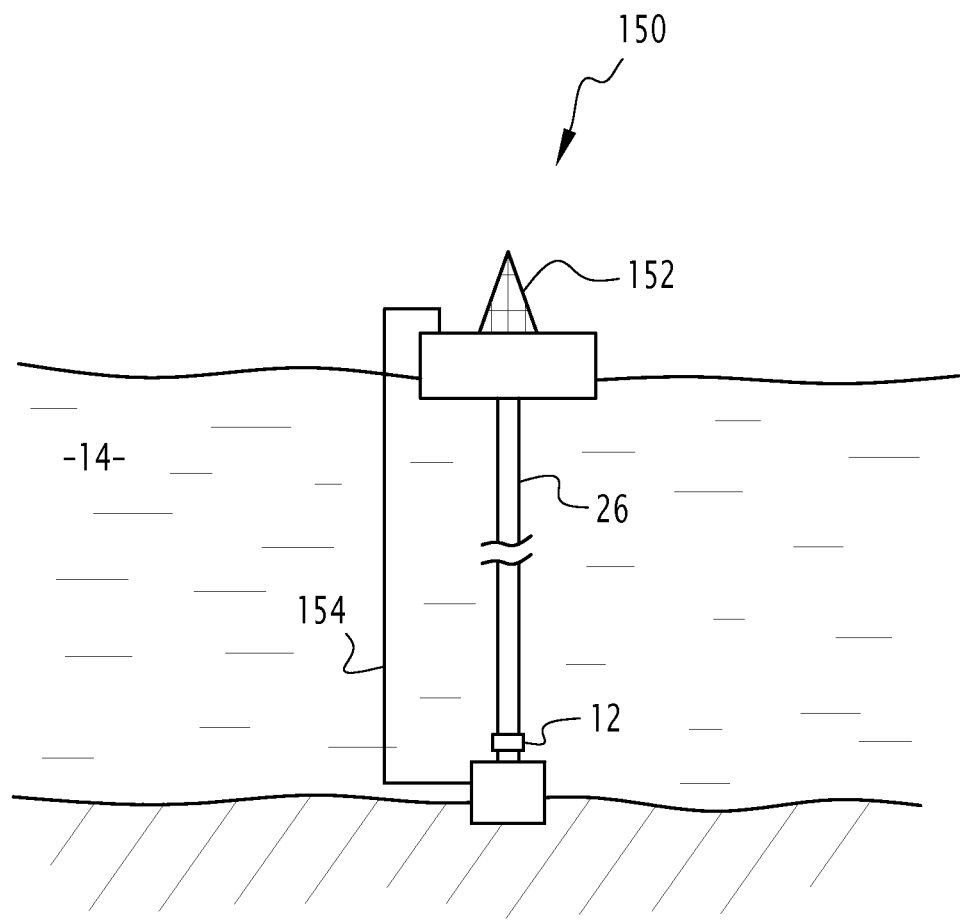
FIG. 6 is a schematic view of a drilling installation comprising a protection device according to the invention.

FIG. 6 depicts another installation 150 according to the invention. The installation 150 is a drilling installation comprising a drilling riser 26, extending from a rig 152 at the surface of the body of water 14.

The flow line protection device 12 is located at the bottom of the drilling riser 26. Only the lower section of the riser 26, upstream of the flow line protection device 12 is pressure rated is a maximum working pressure. The upper part of the riser 26, located downstream of the flow line protection device 12 has a lower pressure rating.

The installation 150 further comprises a pressure relieving line 154, of lesser diameter than the riser 26 to allow pressure relief when the valve 42 is closed.

The invention claimed is:

1. A protection device for a fluid flow line, comprising:
a valve, mobile in the flow line between an open position in which fluid is able to flow in the flow line and a closed position in which fluid is unable to flow in the flow line;
a valve actuator, configured to move the valve to the closed position when a pressure upstream of the valve exceeds a predetermined threshold pressure;
the valve actuator comprising:
a biaser, configured to maintain the valve in the open position;
an actuation mechanism, configured to act against the biaser to move the valve to the closed position, the actuation mechanism delimiting at least a fluid actuated surface able to receive fluid from the flow line;
a fluid sampling passage fluidly connecting the flow line to the fluid actuated surface;
at least one rupture element preventing the passage of fluid from the flow line in the fluid sampling passage downstream of the rupture element when the pressure upstream of the rupture element is lower than the predetermined threshold pressure, the rupture element being configured to break at the predetermined threshold pressure to let fluid from the flow line contact the fluid actuated surface; and;
a removable cartridge containing the at least one rupture element, the removable cartridge being at least partially inserted in the fluid sampling passage.

2. The protection device according to claim 1, wherein the removable cartridge is sealingly mounted in the fluid sampling passage.

3. The protection device according to claim 1, wherein the removable cartridge has a connecting head protruding out of the fluid sampling passage when the removable cartridge is inserted in the fluid sampling passage, the connecting head being configured to be grasped by a remotely operated vehicle or by a diver.

4. The protection device according to claim 1, wherein the removable cartridge has at least an internal lumen connected to an upstream section of the fluid sampling passage and to a downstream section of the fluid sampling passage, the at least one internal lumen receiving the rupture element.

5. The protection device according to claim 4, wherein the removable cartridge has two parallel internal lumens, each lumen containing a rupture element.

6. The protection device according to claim 1, comprising a housing mounted on the flow line, the housing delimiting the fluid sampling passage, an upstream chamber for receiving the fluid actuated surface and a downstream chamber for receiving the valve at least in the open position.

7. The protection device according to claim 6, wherein the housing is made in one piece of a single material.

8. The protection device according to claim 1, wherein the valve is a gate valve or a ball valve.

9. The protection device according to claim 1, wherein the valve actuator comprises at least a manually operated valve, located in the fluid sampling passage, upstream of the rupture element, to manually close the fluid sampling passage when the manually operated valve is activated.

10. The protection device according to claim 1, wherein the removable cartridge is sealingly mounted in the fluid sampling passage with a metal-to-metal seal.

11. A fluid exploitation installation, comprising:
at least a fluid flow line;
a protection device according to claim 1, mounted on the fluid flow line, the fluid sampling passage emerging in the fluid flow line upstream of the valve.

12. The installation according to claim 11, wherein the fluid flow line is located underwater in a body of water.

13. The installation according to claim 12, wherein the fluid flow line is a fluid production line, connected to a wellhead or to a manifold, and/or is located within a manifold or a wellhead, or is a riser connecting a bottom of the body of water to a surface of the body of water.

14. A protection process for a fluid flow line comprising:
(i) provision of a protection device according to claim 1 on a fluid flow line, the valve being in the open position to let the fluid flow through the flow line;
the fluid flowing in the flow line being sampled from the flow line and flowing to the rupture element through the fluid sampling passage;
(ii) when the pressure of the fluid sampled from the flow line is above the predetermined threshold pressure, rupture of the rupture element with the fluid sampled from the flow line in the fluid sampling passage to open the rupture element;
(iii) application of the fluid sampled from the fluid flow line on the fluid actuated surface through the open rupture element,
the fluid sampled from the fluid flow moving the fluid actuated surface to pass the valve from the open position to the closed position against a biasing force of the biaser.

15. The process according to claim 14, wherein the protection device comprises a removable cartridge containing the rupture element,
the process comprising, after passing the valve to the closed position:
diffusing the pressure upstream of the valve;
closing the fluid sampling passage and removing the removable cartridge;
placing another removable cartridge containing an intact rupture element in replacement of the removable cartridge containing an open rupture element;
opening the fluid sampling passage.

16. A protection device for a fluid flow line, comprising:
a valve, mobile in the flow line between an open position in which fluid is able to flow in the flow line and a closed position in which fluid is unable to flow in the flow line;
a valve actuator, configured to move the valve to the closed position when a pressure upstream of the valve exceeds a predetermined threshold pressure;
the valve actuator comprising:
a biaser, configured to maintain the valve in the open position;
an actuation mechanism, configured to act against the biaser to move the valve to the closed position, the actuation mechanism delimiting at least a fluid actuated surface able to receive fluid from the flow line, the actuation mechanism comprising a piston having a piston head and a stem connecting the piston head to the valve, the actuation mechanism further comprising an additional piston located upstream of the piston head and apart from the piston head, the additional piston delimiting the fluid actuated surface, and delimiting, on another side facing the piston head, an intermediate volume containing a transmission fluid;

a fluid sampling passage fluidly connecting the flow line to the fluid actuated surface; and at least one rupture element preventing the passage of fluid from the flow line in the fluid sampling passage downstream of the rupture element when the pressure upstream of the rupture element is lower than the predetermined threshold pressure, the rupture element being configured to break at the predetermined threshold pressure to let fluid from the flow line contact the fluid actuated surface.

17. The protection device according to claim 16, wherein the piston head has a downstream surface onto which an end of the biaser rests, the downstream surface delimiting a downstream space containing fluid, the actuation mechanism comprising at least a bleed connected to the downstream space to receive fluid contained in the downstream space when the valve passes from the open position to the closed position.

* * * * *